United States Patent
Van Rosmalen et al.

[11] Patent Number: 5,245,182
[45] Date of Patent: Sep. 14, 1993

[54] OPTICAL RECORDING AND/OR REPRODUCING APPARATUS WITH OPTICAL SENSING OF SCANNING MIRROR POSITION

[75] Inventors: Gerard E. Van Rosmalen; Willem G. Opheij, both of Eindhoven, Netherlands

[73] Assignee: U.S. Philips Corporation, New York, N.Y.

[21] Appl. No.: 841,607

[22] Filed: Feb. 25, 1992

Related U.S. Application Data

[62] Division of Ser. No. 581,828, Sep. 12, 1990.

[30] Foreign Application Priority Data

Jun. 1, 1990 [NL] Netherlands ............... 9001253

[51] Int. Cl.$^5$ ................................. H01J 3/14
[52] U.S. Cl. ..................... 250/236; 369/44.23
[58] Field of Search ............... 250/560, 561, 234–236; 369/44.22, 44.23; 359/216–221; 358/199, 206, 208

[56] References Cited

U.S. PATENT DOCUMENTS 4,766,308  8/1988  Karlsson ..................... 250/236

Primary Examiner—David C. Nelms
Assistant Examiner—Stephone B. Allen
Attorney, Agent, or Firm—David R. Treacy

[57] ABSTRACT

A polygonal scanning mirror for an optical recorder is magnetically suspended and rotated about a scanning axis. To control position of the scanning mirror, a curved surface mirror is fixed with respect to, and rotates with, the scanning mirror for receiving a radiation beam and reflecting it onto a detector array. The reflected radiation beam is preferably focused by an astigmatic imaging system. Output signals from the detector array are used to control electromagnets of the suspension system.

13 Claims, 3 Drawing Sheets

OPTICAL RECORDING AND/OR REPRODUCING APPARATUS WITH OPTICAL SENSING OF SCANNING MIRROR POSITION

This is a division of application Ser. No. 07/581,828, filed Sep. 12, 1990.

CROSS-REFERENCE TO RELATED APPLICATIONS

This application is related to the subject matter of co-pending U.S. application Ser. No. 07/644,721 filed Jan. 23, 1991 by one of the inventors herein; and is a division of application Ser. No. 07/581,828 filed Sep. 12, 1990.

BACKGROUND OF THE INVENTION

The present invention relates to a device for optically determining the position of an object. The device includes a radiation source unit for generating a radiation beam, a radiation-sensitive detection system and an optical imaging system arranged in the radiation path of the radiation beam for forming a radiation spot on the detection system. The optical imaging system is coupled entirely or partly to the object in such a way that the position of the radiation spot on the detection system is a measure of the position of the object in a direction transverse to the radiation path.

A device of this type may be used, inter alia, for determining the position of a freely suspended scanning mirror in a scanning device. The invention therefore also relates to apparatus for recording and/or reading information in an optical record carrier, which device comprises a polygon mirror rotatable about an axis for scanning the record carrier.

In apparatus for optically recording or reading large quantities of information on a record carrier by a scanning spot, this scanning spot should cover a large distance per unit of time on the record carrier. This is necessary because the information density on the record carrier is bounded by the scanning spot dimension which in its turn is determined by the wavelength of the radiation and the numerical aperture of the scanning system. Both magnitudes cannot be chosen arbitrarily. For example, when a television program of HDTV quality is or has been stored in a digitized form on the optical record carrier and if the linear information density on the record carrier is approximately 1.5 bit/$\mu$m, the scanning speed of the scanning spot should be approximately 60 m/s. Even when using a limited number of parallel scanning spots, the scanning speed is more than 10 m/s. To reach such a speed using a scanning mirror, for example, a rotating polygon mirror, and to keep the scanning spot accurately aimed at the positions to be scanned, a constant measurement of the polygon or mirror position and feedback to the control mechanism of the mirror is necessary.

Such a measurement is to be preferably performed in a contactless way, for which, according to the invention, a device as described in the opening paragraph can be used.

Such a device is described per se from EP-A-0,124,145. This application describes an optical measuring system in which the end of a first optical fiber is imaged by a lens or a concave mirror on a plane in which the ends of the two other optical fibers are located. The first optical fiber is connected to a radiation source and the second other fibers are connected to detectors. The imaging lens or mirror is coupled to a membrane whose displacement results in a displacement of the lens or mirror transversely to the direction of the incident radiation beam. Consequently, the radiation spot which has been formed is also displaced with respect to the ends of the two optical fibers so that the relative radiation intensity on the two detectors changes. In this way the relative intensity received by the detectors is a measure of the position of the object in a direction transverse to the radiation path to which the lens is coupled.

In the conventional device it is not possible to detect the displacement of the imaging system in a direction parallel to the radiation beam. For an accurate determination of the position of an object, such as a polygon mirror or another scanning mirror, it is, however, necessary to measure the position in three dimensions in a rapid and reliable manner with a minimum possible number of additional optical systems. Possible additional optical elements should preferably not be coupled mechanically to the scanning mirror because this would lead to an increase of the mass and the complexity of the system of the scanning mirror.

SUMMARY OF THE INVENTION

The invention has, inter alia, for its object to provide a device generally described in the opening paragraph in which the location or position of the object can also be determined in the direction of the radiation beam with the aid of only one optical imaging system. Such device according to the invention is characterized in that the device is also provided with means for changing the radiation spot on the detection system in dependence upon the position of the object in the direction of the radiation path.

The location or position of the object is determined by measuring the change in shape of the radiation spot with the aid of the radiation-sensitive detection system. Simultaneously, the position of the object in the direction transverse to the radiation beam is detected by the position of the radiation spot on the detection system.

A first illustrative embodiment of the device according to the invention is characterized in that an astigmatic element for introducing astigmatism into the radiation beam is arranged in the radiation path between the optical imaging system and the detection system. The detection system is adapted to detect the shape of the radiation spot. The position of the object can be determined with sufficient accuracy by means of astigmatism. It is to be noted that it is known per se from U.S. Pat. No. 4,023,033 to correct the position of a lens in a radiation beam in the radiation direction by an astimatic technique. However, in the disclosed device the radiation beam is focused on a reflecting surface by an objective lens. In this case the position of the lens itself is not important, but the relative distance between the lens and the surface is important. Furthermore, the lens is fixed with respect to the radiation source and the detection system in the direction transverse to the direction of radiation.

This embodiment may be further characterized in that the optical system is adapted to form a convergent beam at the location of the astigmatic element and in that the astigmatic element is a plane-parallel plate which is arranged obliquely in the radiation path. The embodiment may also be characterized in that the astigmatic element is a hologram or a cylindrical lens. In both cases the astigmatic element may be connected to the object or it may be fixed with respect to the radiation source unit and the detection system. With a view to mass reduction, the latter is preferred.

A second illustrative embodiment of the device according to the invention is characterized in that a roof prism for forming two radiation spots on the radiation-sensitive detection system is arranged in the radiation path between the optical imaging system and the detection system, the distance between the radiation spots being a measure of the position of the object in the direction of the radiation path. In this way the position of the imaging system in the direction of the radiation beam can also be measured. It is to be noted that it is known per se, for example, from EP-A 0,063,830 to which U.S. Pat. No. 4,425,043 corresponds, or to U.S. Pat. No. 4,533,826, to correct the position of a lens relative to a reflective surface by a roof prism. However, also in this case the position of the objective lens is not important but the correct focusing of a beam on a reflective surface is important, and the lens cannot move in a direction transverse to the direction of the radiation beam.

An illustrative embodiment of the detection system is further characterized in that the optical imaging system has at least one reflective element. Consequently, the radiation source unit and the detection system can be placed close to each other from a constructive point of view and it is not necessary to take an ongoing radiation beam into account at the object. The imaging system may thus be provided at a side of the object facing the radiation source and the detection system. Moreover, space for the radiation path should only be available at one side of the object.

The device according to the invention may be further characterized in that the reflective element of the optical imaging system comprises a concave or a convex mirror. The concave or convex mirror forms the optical imaging system or is a part of it. The use of a convex mirror may have the constructive advantage that the reflective element can be arranged on a face of the object, for example, by means of glueing without the object itself having to be subjected to a separate treatment.

The device is preferably characterized in that the concave or convex mirror has a spherical shape. A rotation of the object around an arbitrary axis through the center of the sphere does then not have any influence on the measurement of the position. Moreover, a sphere can be easily made.

In a preferred illustrative embodiment of the device according to the invention, the device is characterized in that the optical imaging system has a further portion which is arranged in a fixed position relative to the radiation source and the detection system. The imaging system thus comprises a portion which is not coupled to the object so that less stringent requirements need to be imposed on the portion which is coupled to the object. For example, the volume and mass of the portion coupled to the object can be minimized, while an optical system of high quality comprising a plurality of elements can nevertheless be used.

In addition to the location or position of the object, the orientation or tilt of the object in the space is important, for example, for determining where the scanning beam reflected by a scanning mirror is incident on a surface to be scanned.

A device according to the invention which does not only determine the position but also the tilt of the object is further characterized by also having optical means for deflecting radiation from the radiation beam in dependence upon the tilt of the object being coupled to the object and by the detection system being further adapted to detect the deflected radiation and hence the tilt of the object.

An illustrative embodiment is further characterized in that the means for deflecting radiation are reflective means. The means for measuring the tilt are constituted, for example, by a plane mirror. This mirror can be simply combined with a reflective portion of the imaging system.

It is to be noted that it is disclosed per se from U.S. Pat. No. 4,829,175 to determine the position of the rotation axis of a polygon mirror by means of a radiation beam which is reflected on an end face of the polygon. However, in this conventional device the position of the polygon mirror in the space is not simultaneously measured so that only limited information about the polygon mirror is available. In that device the mirror position is determined by a mechanical bearing. A mechanical bearing limits the maximum rotation speed and is undesirable at high rotation speeds.

The portions for determining the position and the orientation of the object may be combined, for example, in an illustrative embodiment which is characterized in that the optical imaging system has a further portion which is arranged in a fixed position relative to the radiation source and the detection system, which further portion is integrated with a beam splitter for splitting the radiation beam into two sub-beams for determining the position and the tilt, respectively, of the object.

In this manner the generated radiation beam is not split into a beam for determining the position and the tilt until the radiation is incident on the imaging system. The radiation path between the radiation source and the imaging system is singular. In a further embodiment the radiation paths of the deflected radiation may also extend in common and thus comprise common optical components.

One field of use or application of a device for determining the position and/or the tilt of an object according to the invention is the determination of these magnitudes for a polygon mirror which is rotatable about an axis and is used in an apparatus for optically scanning an object or an area, for example, for scanning an optical record carrier.

According to the invention, such apparatus for recording and/or reading information in an optical record carrier comprises a radiation source unit, a detection system and an imaging system which has at least one part coupled to the polygon mirror for forming a radiation spot on the detection system, the radiation source unit, the detection system and the imaging system forming part of a device for determining the position of the polygon mirror and/or the position of the rotation axis of the rotatable polygon mirror. Such a polygon mirror is used to scan parallel strips on the record carrier at a high speed so that it is necessary to monitor the position of the polygon mirror and the position of the axis carefully so as to avoid that strips which have already been scanned are scanned once more, or that strips to be scanned are skipped.

An illustrative embodiment of such apparatus comprises a rotatable polygon mirror, with a rotationally symmetrical concave or convex mirror being arranged around the rotation axis. By arranging the concave or convex mirror, which is used to determine the position of the polygon mirror, rotationally symmetrically around the rotation axis, the rotation of the polygon mirror about the rotation axis does not have any influence on the measurement of the position.

According to the invention apparatus for recording and/or reading an optical record carrier by means of a rotatable polygon mirror is preferably implemented in a way in which the rotatable polygon mirror is magnetically journalled by means of a plurality of electromagnets, which apparatus is further adapted to apply energizing signals to the electromagnets in dependence upon output signals of the detection system.

In this case the polygon mirror is freely suspended in a magnetic field so that there is no friction with bearings when it rotates. The polygon mirror and the rotation axis are held in their correct positions with the help of a position detection device as described in the foregoing.

These and other more detailed aspects of the invention will now be described in greater detail with reference to the drawings.

DETAILED DESCRIPTION OF THE PREFERRED EMBODIMENT

Figure 1:
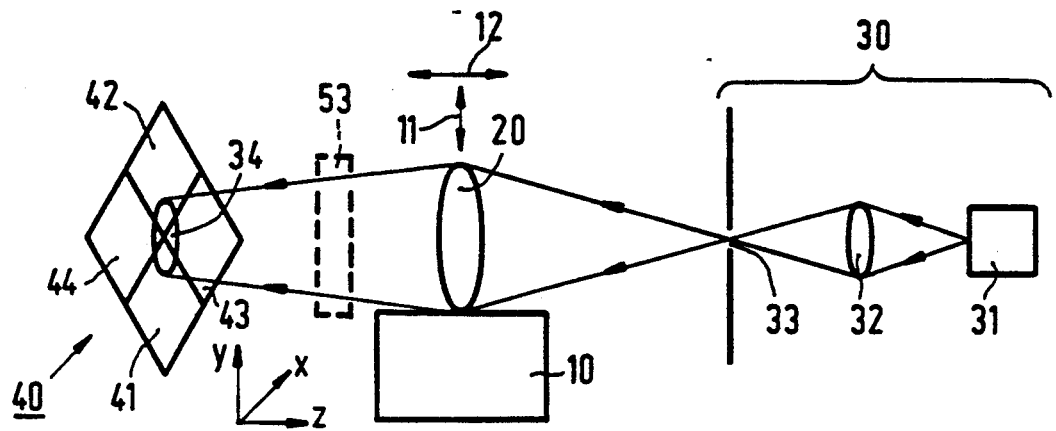
FIG. 1 shows diagrammatically a first illustrative embodiment of a device according to the invention.

The reference numeral 10 in FIG. 1 denotes an object which can move freely within certain boundaries. The object 10 is coupled to a lens 20 whose position is directly related to the position of the object 10. The lens 20 is secured, for example, to the object or connected to this object via a lever, a beam, or a shaft. A radiation source unit 30 is arranged at one side of the lens 20 and a detection system 40 is arranged at the other side. The radiation source unit 30, the detection system 40 and the lens 20 are positioned with respect to one another in such a way that the radiation source unit 30 is imaged on the detection system 40 when the object and the lens are in their nominal positions. The radiation source unit comprises, for example, a lamp 31, a condensor lens 32 and a diaphragm 33.

The detection system 40 is a position-sensitive detection system and comprises, for example, four radiation-sensitive diodes 41, 42, 43 and 44 arranged in a square. The lens 20 is implemented in such a way that it exhibits astigmatism so that the shape of the radiation spot 34 projected on the detection system 40 depends on the position of the lens 20 in the direction of the principal axis of the radiation beam coming from the radiation source unit 30 and being incident on the lens 20.

When the object 10 and hence the lens 20 are displaced in the direction of the double-headed arrow 11, the x or the y direction transverse to the direction of the radiation beam, the spot 34 formed on the detection system 40 is displaced in the same direction as the lens 20. When the object 10 and hence the lens 20 are displaced in the direction of the arrow 12, the z direction, i.e. in a direction parallel to that of the radiation beam, the shape of the spot 32 changes from a circle to a lying ellipse or a standing ellipse because the lens 20 is a lens has a considerable extent of astigmatism. The position of the lens 20 and hence that of the object 10 may be defined in three directions from the shape and the position of the radiation spot 34. Astigmatism may not only be introduced into the radiation beam by means of the lens 20 but also by means of an extra element 53, which is not connected to the object 10 for example a grating, a hologram or a cylindrical lens.

To be able to derive three signals from the radiation spot 34, which signals define the position of the lens in the x, y and z directions, the detection system 40 is subdivided into four detectors 41, 42, 43 and 44 which are arranged in a square and in which the bounding lines between the detectors extend at an angle of 45° to the axes of the lying or standing elliptical shape of the radiation spot 34. The detection elements 41 and 42 are juxtaposed in the y direction and the detection elements 43 and 44 are juxtaposed in the x direction. The signals defining the position of the lens can then be derived from the output signals of the detection system via the relations:

$$S_x = (I_{43} - I_{44})$$

$$S_y = (I_{41} - I_{42})$$

$$S_z = (I_{41} + I_{42}) - (I_{43} + I_{44})$$

in which $S_x$, $S_y$ and $S_z$ are signals defining the displacement with respect to a nominal position and $I_{41}$, $I_{42}$, $I_{43}$ and $I_{44}$ indicate the intensity detected by each detection element. To define the exact position from these signals $S_x$, $S_y$, and $S_z$, a correction should be carried out due to influences such as the intensity of the beam and the effect of the pupil of the lens on the displacement and shape of the radiation spot.

Figure 2:
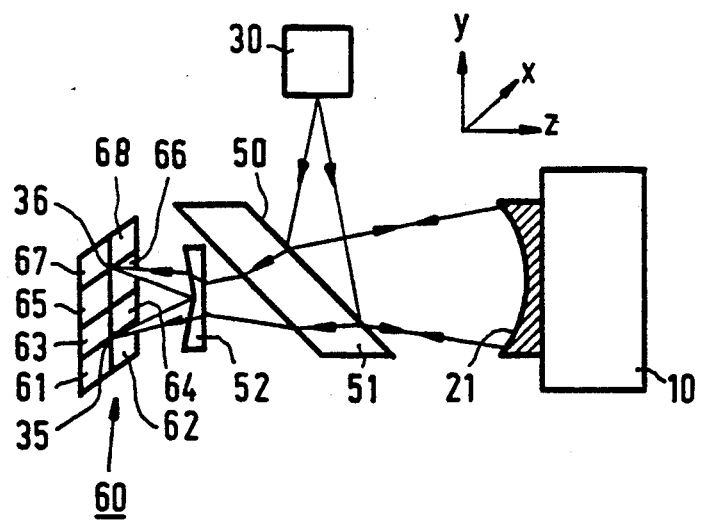
FIG. 2 shows an alternative illustrative embodiment in which a reflective optical element is used.

FIG. 2 shows an illustrative embodiment in which the optical system is reflective. A concave mirror 21 is secured to the freely movable object 10. A radiation source 30, shown in FIG. 2 as a semiconductor laser, generates a radiation beam which is incident on the concave mirror 21 via a partially transparent mirror 50. The beam reflected thereby is subsequently incident on a roof prism 52 through the plane-parallel plate 51. The roof prism splits the radiation beam into two sub-beams each of which forms a radiation spot 35, 36, respectively, on the radiation-sensitive detection system 60. The mutual distance between the two radiation spots 35 and 36 is a measure of the position of the concave mirror 21 and the object 10 in the direction of the radiation beam, the z direction.

The detection system 60 comprises, for example, eight radiation-sensitive elements 61, 62, 63, 64, 65, 66, 67 and 68 constituting two parallel rows of four elements each and being arranged in such a manner that the bounding line between the row comprising the elements 61, 63, 65 and 67, and the row comprising the elements 62, 64, 66 and 68 coincides with the nominal positions of the radiation spots 35 and 36. The pairs 61, 62 and 63, 64 are arranged in such a way that they are located on both sides of the nominal position of the radiation spot 35. The pairs 65, 66 and 67, 68 are arranged in an analogous manner with respect to the radiation spot 36.

The position of the concave mirror 21 can be defined from the radiation distribution on the detection elements in the x, y and z directions in accordance with:

$S_x = (I_{62} + I_{64} + I_{66} + I_{68}) - (I_{61} + I_{63} + I_{65} + I_{67})$ $S_y = (I_{63} + I_{64} + I_{67} + I_{68}) - (I_{61} + I_{62} + I_{65} + I_{66})$ and $S_z = (I_{61} + I_{62} + I_{67} + I_{68}) - (I_{63} + I_{64} + I_{65} + I_{66})$.

The transparent plane-parallel plate 51 on which the partially transparent mirror 50 is arranged is located in a convergent radiation beam in the embodiment shown. As a result, astigmatism is introduced into the radiation beam after the plane-parallel plate 51, so that the position of the concave mirror 21 in the z direction can also be determined by the astigmatic method as illustrated with reference to FIG. 1.

Figure 3A:
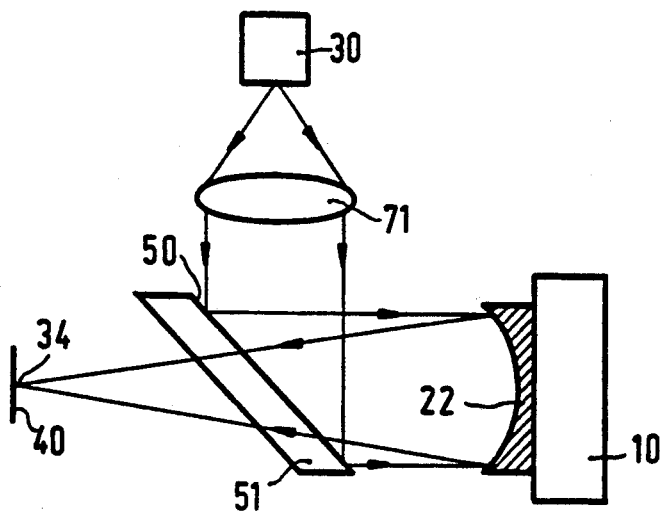
FIGS. 3a, 3b and 3c show diagrammatically some other illustrative embodiments for the reflective optical element.
Figure 3B:
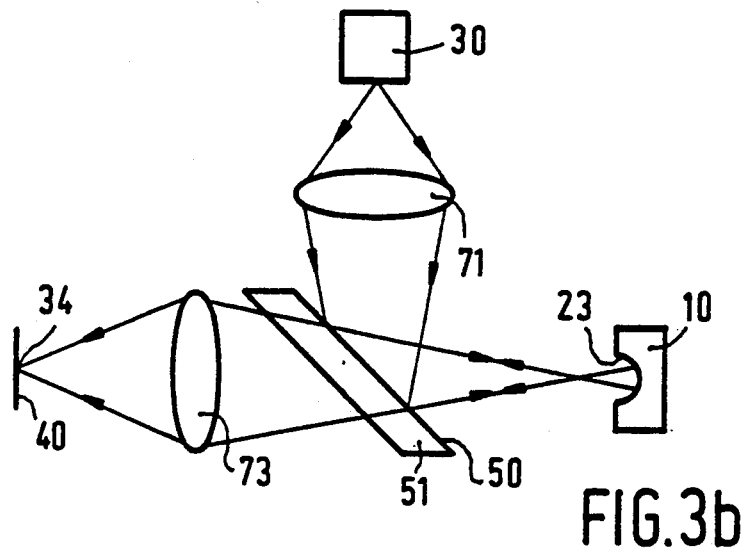
Figure 3C:
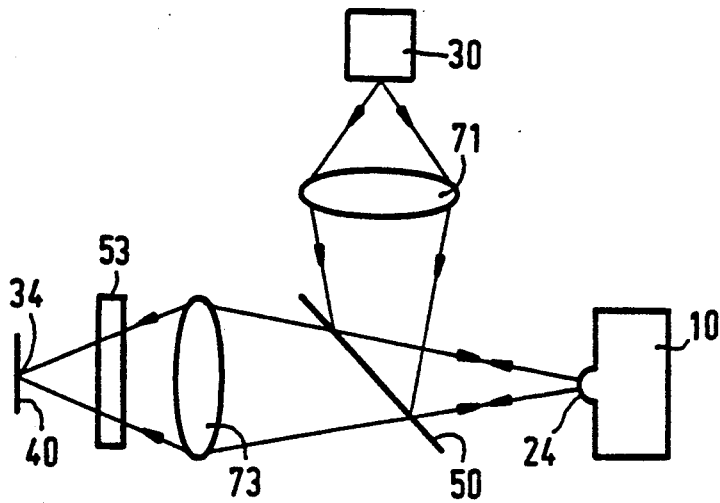

FIGS. 3a, 3b and 3c show diagrammatically some other embodiments of a mirror connected to the object for use in accordance with the invention. In FIG. 3a the radiation beam generated by the radiation source 30 is formed to a parallel beam by means of a lens 71, which beam is incident on the concave paraboloid mirror 22 via the partially transparent mirror 50. This paraboloid mirror focuses the beam on the detection system 40 where a radiation spot 34 is formed. In FIGS. 3b and 3c the radiation beam is focused in the focal point near the object 10 by means of the lens 71. A spherical mirror 23 or 24, concave 23 in FIG. 3b and convex 24 in FIG. 3c, is connected to the object 10 and the central point of the spherical shape of this mirror coincides with said focal point when the mirror 23 or 24 is in its nominal position.

The radiation beam is reflected by the mirror 23 or 24 and after it has traversed the beam splitter or partially transparent mirror 50 it is focused by the lens 73 to a radiation spot 34 on the detection system 40. Astigmatism is introduced into this beam, for example, by arranging an oblique plane-parallel plate 51 in a convergent or divergent part of the beam. A cylindrical lens or a grating 53 may also be arranged in the beam. The distortion of the radiation spot 34 which is caused thereby is subsequently detected on the detection system 40, for example, in the manner as described with reference to FIG. 1.

Apart from a paraboloid or spherical shape, the mirror may also have a hyperboloid or ellipsoid shape. In that case the radiation beam is focused on the first focus of the hyperboloid or ellipsoid by means of the lens 71 and the second focus is coincides with the detection system or is imaged thereon via a further optical imaging system.

In the embodiments shown the position of the radiation spots on the detection system is only determined by the position of the object and not by its orientation.

Figure 4:
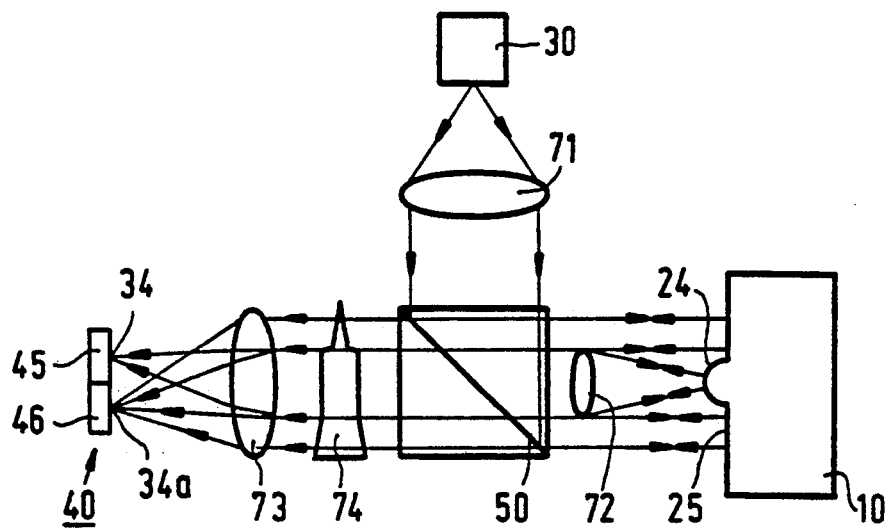
FIG. 4 provides embodiment in which also the tilt of the object is measured.

FIG. 4 shows a first embodiment of a system with which the orientation of the object can also be determined. In this embodiment the position is determined by way of example with the aid of a convex mirror 24, as in FIG. 3c. A plane mirror 25 has been arranged in addition to the convex mirror 24. The device is provided with a condensor lens 71 with which the radiation beam generated by the radiation source is converted into a parallel beam. This parallel beam is deflected in the direction of the object 10 via reflection on the beam splitter 50. An objective lens 72 with which a part of the beam is focused to a point coinciding with the nominal position of the centre of the convex mirror 24 is arranged in this beam. As is shown in the Figure, this can be achieved in that the lens 72 only covers a part of the cross-section of the radiation beam. It is, for example, alternatively possible to arrange an optical wedge in the radiation beam with which a part of the beam is guided past the objective lens 72. The part of the radiation beam traversing the lens 72 and being reflected on the curved mirror 24 is projected on the detection system 40 via the beam splitter 50 and the lens 73 for supplying a signal from which the position of the object 10 can be derived. The other part of the beam is incident on the plane mirror 25 and, after it has traversed the beam splitter 50 and the lens 73, it forms a second radiation spot 34a on the detection system. The position of this radiation spot 34a almost exclusively depends on the tilt of the plane mirror 25 and does not depend or hardly depends on its position. By providing a wedge or prism in one of the two radiation beam parts which are reflected by the mirrors 24 and 25, respectively, the radiation spots 34 and 34a are spatially separated from each other so that they are detected independently of each other on two portions 45 and 46 of the detection system 40. In the illustrative embodiment of FIG. 4 this is realized by arranging an optical element 74 in the radiation beam, which element is wedge-shaped in the portion which is traversed by radiation from the plane mirror 25 and which has a constant thickness in the rest of the beam.

Figure 5:
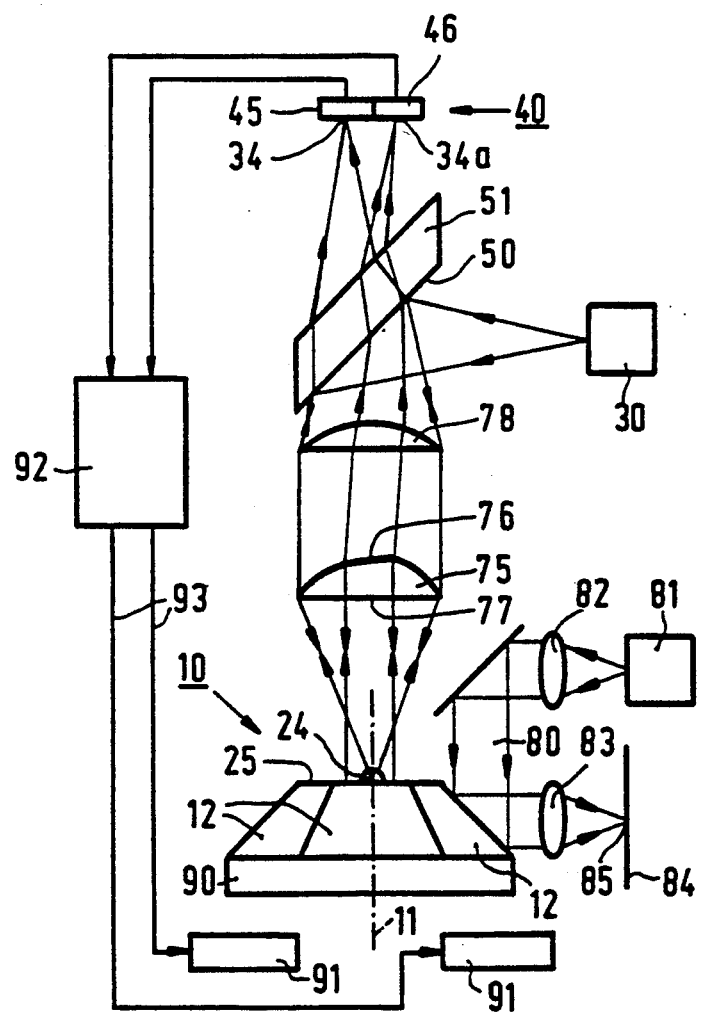
FIG. 5 shows an illustrative embodiment for stabilizing a rotating polygon mirror.

In FIG. 4, the beam splitter 50 may not only be implemented as a splitting cube but also as a partially transparent mirror and be supported by a plane-parallel plate by means of which astigmatism is introduced into the beam between the object 10 and the detection system 40. A preferred illustrative embodiment is depicted in FIG. 5, wherein an application of the position detection device is shown for stabilizing a rotating polygon mirror. FIG. 5 includes a semiconductor laser 30 for generating the radiation beam and a partially transparent mirror 50 for deflecting the radiation beam towards the object 10. A collimator lens 78 with which the beam is made parallel and a lens 75 for focusing the radiation beam on the curved mirror 24 on the object 10 are arranged between the partially transparent mirror 50 and the object 10 in this embodiment. The lens 75 has a plane central portion 76, which plane and a corresponding plane 77 in the other reflective surface of the lens extend at a small angle to each other so that this portion functions as an optical wedge. The lens 75 focuses the light incident on the peripheral refractive surface towards a point which coincides with the central point, or a focal point, of the convex mirror 24 on the object 10. This radiation is reflected by the mirror 24 and focused on the detection system 40 via the lenses 75 and 78 and the plane-parallel plate 51. In the manner described hereinbefore a radiation spot 34, whose position and shape provide information about the position of the mirror 24 and hence of the object 10, is formed on the portion 45 of the detection system 40.

The radiation which is incident on the plane central portion 76 of the lens 75 is not focused on the convex mirror 24 but is incident on the reflective surface 25 around it. This radiation is reflected thereon, while the direction of the reflected radiation exclusively depends on the tilt of the plane mirror 25 and hence of the object 10. The reflected beam again traverses the wedge which comprises the faces 76 and 77 in the lens 75, subsequently it traverses the lens 78 and the partially transparent mirror 50 and forms a radiation spot 34a on the portion 46 of the radiation-sensitive detection system 40. The position of this spot 34a defines the tilt of the plane mirror 25 and hence the tilt of the object.

The radiation-sensitive detection system 40 comprises, for example, two quadrant detectors 45 and 46 each consisting of four radiation-sensitive elements with which the position as well as the shape of the radiation spots 34 and 34a formed is determined.

An application of the position and orientation detector according to the invention is also shown in FIG. 5. The object 10 is, for example, a polygon mirror which is rotatable about a shaft 11. The polygon mirror has a plurality of facets, shown in the Figure as faces 12 extending at an angle of 45° to the rotation shaft 11. A radiation beam 80 from a radiation source 81 and the condensor lens 82 is incident on the reflective faces 12 of the polygon mirror and is deflected thereby, dependent on the position of the polygon. The radiation beam is focused to a radiation spot 85 on a surface 84 to be scanned via a lens system 83, for example, an f-θ lens. This surface forms part of, for example, an optical record carrier which is recorded or read by means of the scanning beam 80. The record carrier is, for example, a disc-shaped or tape-shaped record carrier which is recorded by means of a large number of parallel, relatively short tracks or strips. The direction of the tracks or strips is determined by the combined displacement of the record carrier 84 with respect to the scanning device and the movement of the scanning spot 85 due to the rotation of the polygon.

To be able to record or read information on the record carrier sufficiently rapidly in this manner, for example, for a HDTV program (high-definition television), the polygon should rotate at a speed of several thousand revolutions per second. To achieve this, the polygon is magnetically journalled and secured to a metal or magnetized disc 90 which is held in position and driven by a plurality of electromagnetic coils 91.

The radiation spots 34 and 34a which are formed on the detection system 40 via the reflective surface 25 and the convex mirror 24 are converted by the detection elements in the system 40 into electric signals which provide information about the position and tilt of the polygon and are analysed in a processing unit 92. This processing unit subsequently supplies output signals 93 which are applied to the electromagnets 91 with which the magnetic fields generated thereby are influenced. The position and the tilt of the rotating polygon mirror is kept constant thereby.

To increase the scanning speed or to realise a lower rate of revolution of the polygon, it is possible to implement the optical system 81-83 in such a way that the record carrier simultaneously scans a plurality of parallel tracks by means of a plurality of scanning spots.

We claim:

1. An apparatus for recording and/or reading information in an optical record carrier, comprising a source of a beam of radiation, a polygon mirror, means for positioning and rotating said mirror about a rotation axis for scanning the record carrier, a detection system, and an imaging system including at least one optical part fixed to the polygon mirror for forming a radiation spot on the detection system, the position of said rotation axis and the position of the polygon mirror being positions affecting the scanning of the record carrier, characterized in that said source of radiation, said detection system and said imaging system form part of a device for determining one of said positions and producing a control signal responsive to said one of said positions.

2. An apparatus as claimed in claim 1, characterized in that said control signal is applied to said means for positioning and rotating.

3. An apparatus as claimed in claim 1, characterized in that said means for positioning and rotating comprises a plurality of electromagnets for magnetically journalling said mirror, and means for applying energizing signals to said electromagnets responsive to said control signal.

4. An apparatus as claimed in claim 1, characterized in that said optical part comprises a reflective face disposed perpendicular to the rotation axis, and a rotationally symmetrical mirror having a curved-surface face arranged around said axis.

5. An apparatus as claimed in claim 4, characterized in that said means for positioning and rotating comprises a plurality of electromagnets for magnetically journalling said mirror, and means for applying energizing signals to said electromagnets responsive to said control signal.

6. An apparatus for recording and/or reading information in an optical record carrier, comprising a source of a beam of radiation, a polygon mirror, means for positioning and rotating said mirror about a rotation axis for scanning the record carrier, a detection system, and an imaging system including at least one optical part fixed to the polygon mirror for forming a radiation spot on the detection system, the position of said rotation axis and the position of the polygon mirror being positions affecting the scanning of the record carrier, characterized in that said means for positioning and rotating comprises a magnetic bearing and an electric motor, constituted by a plurality of electromagnets suspending and positioning said polygon mirror and driving said mirror about said axis, and said source of radiation, said detection system and said imagining system form part of a device for determining one of said positions and producing a control signal responsive to said one of said positions.

7. An apparatus as claimed in claim 6, characterized in that said means for rotating includes means, responsive to output signals of said detection system, for applying energizing signals to said electromagnets.

8. An apparatus as claimed in claim 6, characterized in that said means for positioning and rotating comprises means, responsive to said control signal, for applying energizing signals to the electromagnets comprising said magnetic bearing.

9. An apparatus as claimed in claim 8, characterized in that at least one of said electromagnets forms a part of said magnetic bearing and said electric motor.

10. An apparatus as claimed in claim 6, characterized in that said optical part comprises a reflective face disposed perpendicular to the rotation axis, and a rotationally symmetrical mirror having a curved-surface face arranged around said axis.

11. An apparatus as claimed in claim 10, characterized in that said means for rotating includes means, responsive to output signals of said detection system, for applying energizing signals to said electromagnets.

12. An apparatus as claimed in claim 10, characterized in that said means for positioning and rotating comprises means, responsive to said control signal, for applying energizing signals to the electromagnets comprising said magnetic bearing.

13. An apparatus as claimed in claim 12, characterized in that at least one of said electromagnets forms a part of said magnetic bearing and said electric motor.

* * * * *